US008734651B2

(12) United States Patent
Chun et al.

(10) Patent No.: US 8,734,651 B2
(45) Date of Patent: May 27, 2014

(54) MULTI-COMPONENT FILTERS

(75) Inventors: Doris Pik-Yiu Chun, Santa Clara, CA (US); Hou T. Ng, campbell, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 576 days.

(21) Appl. No.: 13/024,222

(22) Filed: Feb. 9, 2011

(65) Prior Publication Data

US 2012/0199537 A1 Aug. 9, 2012

(51) Int. Cl.
*C02F 1/42* (2006.01)
*C02F 1/28* (2006.01)

(52) U.S. Cl.
USPC ........... 210/660; 210/681; 210/287; 210/269; 210/689; 210/690; 210/694

(58) Field of Classification Search
None
See application file for complete search history.

(56) References Cited

U.S. PATENT DOCUMENTS

| | | | | | |
|---|---|---|---|---|---|
| 4,762,617 | A | * | 8/1988 | Stevens | 210/635 |
| 4,778,604 | A | * | 10/1988 | Leonard et al. | 210/664 |
| 4,840,730 | A | * | 6/1989 | Saxena | 210/198.2 |
| 5,178,832 | A | * | 1/1993 | Phillips et al. | 422/401 |
| 5,916,531 | A | * | 6/1999 | Pan | 422/211 |
| 6,485,127 | B2 | | 11/2002 | Ohsawa | |
| 6,856,778 | B2 | * | 2/2005 | Vejtasa et al. | 399/237 |
| 7,676,179 | B2 | | 3/2010 | Hobo | |
| 7,801,465 | B2 | | 9/2010 | Thompson | |
| 2005/0121392 | A1 | * | 6/2005 | Hoffman | 210/656 |
| 2005/0236335 | A1 | * | 10/2005 | Karaman | 210/665 |
| 2009/0255401 | A1 | | 10/2009 | Hunter | |

FOREIGN PATENT DOCUMENTS

| | | |
|---|---|---|
| JP | 2002200771 | 7/2002 |

* cited by examiner

*Primary Examiner* — Lore Jarrett
*Assistant Examiner* — Benjamin J Behrendt
(74) *Attorney, Agent, or Firm* — Gail Su

(57) ABSTRACT

An apparatus for conducting single-pass filtration of ink waste is disclosed. The apparatus includes: a filter connected to a housing unit and a plurality of absorbent layers within the housing unit, wherein the plurality of absorbent layers are in any order and include: a layer for removing metal and polar compounds, a layer for removing non-polar color impurities, a layer for removing acid functional components, a layer for removing additives with polar or protic functional groups, and a layer for removing residual water. A process and a system that include or utilize the apparatus are also disclosed.

7 Claims, 5 Drawing Sheets

MULTI-COMPONENT FILTERS

BACKGROUND

Printing processes, such as liquid electro-photographic (LEP) printing and transfer printing, may result in ink waste or leftover ink. For example, ink waste or leftover ink may be generated when ink fountains are cleaned, when ink has exceeded its shelf life, or when ink has been contaminated. Ink waste or leftover ink may be difficult to dispose of and may include an oil-based carrier, such as solvents sold under the Exxon Mobil Corporation trademarked name ISOPAR™, colorants, polar and protic additives, and other impurities.

The carrier in ink waste can be recycled if it is filtered of colorants, polar and protic additives, and other impurities, such that the remaining filtered carrier has a conductivity less than 10 pico-Siemens per centimeter (pS/cm) and no absorbance when it is exposed to light having wavelengths between 380 nanometers (nm) and 800 nm. Using ink with recycled carrier that has absorbance at any wavelength between 380 nm and 800 nm or has a conductivity greater than 10 pS/cm indicates the presence of residual impurities which may result in undesirable disturbances to the jetting performance and stability of the printing process.

DESCRIPTION

Reference is now made in detail to specific examples for practicing the invention. When applicable, alternative examples are also briefly described.

In the following detailed description, reference is made to the drawings accompanying this disclosure, which illustrate specific examples in which this disclosure may be practiced. The components of the examples can be positioned in a number of different orientations and any directional terminology used in relation to the orientation of the components is used for purposes of illustration and is in no way limiting. Directional terminology includes words such as “top,” “bottom,” “front,” “back,” “leading,” “trailing,” etc.

It is to be understood that other examples in which this disclosure may be practiced exist, and structural or logical changes may be made without departing from the scope of the present disclosure. Therefore, the following detailed description is not to be taken in a limiting sense. Instead, the scope of the present disclosure is defined by the appended claims.

As used herein, the term “top” is not limited to any particular orientation and can include above, next to, adjacent to, and/or on.

As used herein, the term “bottom” is not limited to any particular orientation and can include next to, adjacent to, and/or below.

As used herein, the term “stacked” is not limited to any particular orientation and can include above, below, next to, adjacent to, and/or on.

As used herein, “ink waste” refers to oil-based inks that, if left as-is, cannot or will no longer be used in any printing process. Ink waste may include an oil-based carrier, such as solvents sold under the Exxon Mobil Corporation trademarked name ISOPAR™, colorants, polar and protic additives, and other impurities.

The article ‘a’ and ‘an’ as used in the claims herein means one or more.

Currently, there are filtration units available for filtering out specific components in ink waste. However, there appear to be no filtration units capable of efficiently filtering out multiple components in ink waste.

Figure 1A:
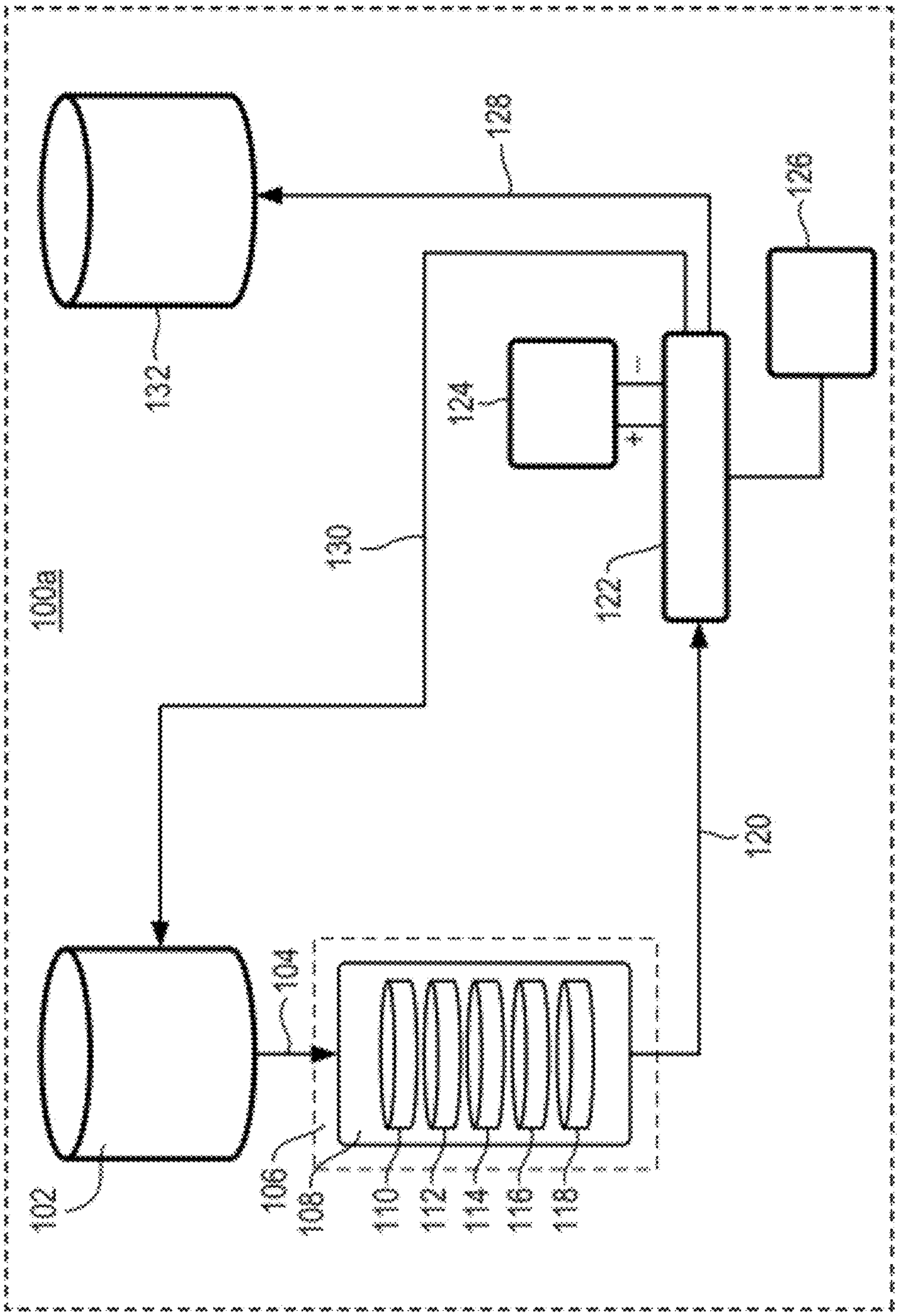
FIG. 1A illustrates one example of a system including an apparatus for conducting single-pass filtration of ink waste and a feedback loop for monitoring the quality of the filtered ink.

FIG. 1A illustrates one example of a system including an apparatus for conducting single-pass filtration of ink waste and a feedback loop for monitoring the quality of the filtered ink. The system may include a tank of ink waste 102, a connector 104 for feeding the ink waste into a filtration unit 106, a connector 120 for feeding the ink waste from the filtration unit 106 into a device 122 for measuring ultraviolet-visible absorbance and a device 124 for measuring conductivity, a printer 126, a connector 130 for feeding the ink waste from the devices 122-124 back into the tank of ink waste 102 if the ink waste has absorbance at any wavelength between 380 nm and 800 nm or has a conductivity greater than 1 pS/cm, a connector 128 for feeding the ink waste from the devices 122-124 into a second tank 132 if the ink waste has no absorbance at wavelengths between 380 nm and 800 nm and has a conductivity less than or equal to 1 pS/cm, and the second tank 132.

The apparatus for conducting single-pass filtration of ink waste is a filtration unit 106 that may include a housing unit 108 and a plurality of absorbent layers 110-118. The plurality of absorbent layers 110-118 may include a layer for removing metal and polar compounds 110, a layer for removing non-polar color impurities 112, a layer for removing acid functional components 114, a layer for removing additives with polar or protic functional groups 116, and a layer for removing residual water 118. In one example, the plurality of absorbent layers may be in the following order from top to bottom: the first layer may be the layer for removing metal and polar compounds 110; the second layer may be the layer for removing non-polar color impurities 112; the third layer may be the layer for removing acid functional components 114; the fourth layer may be the layer for removing additives with polar or protic functional groups 116; and the fifth layer may be the layer for removing residual water 118. In other examples, the plurality of absorbent layers 110-118 may be stacked in any order.

In some examples, the layer for removing metal and polar compounds 110 and the layer for removing non-polar color impurities 112 together may comprise between 60% and 80% of the volume of the plurality of absorbent layers. In these examples, the ratio of the layer for removing metal and polar compounds 110 to the layer for removing non-polar color impurities may range from 5:1 to 2:1. There is no range of specific ratios that the remaining layers, the layer for removing acid functional components 114, the layer for removing additives with polar or protic functional groups 116, and the layer for removing residual water 118, should have to each other.

The layer for removing metal and polar compounds 110 may function as a metal and polar compounds absorbent. It may be used to remove from ink waste, if any, heavy metals such as copper ions ($Cu^{2+}$) and zinc ions ($Zn^{2+}$), water, particulates, flocculants, chemicals capable of undergoing cation exchange, and other unwanted polar or metal compounds. In some examples, the layer for removing metal and polar compounds 110 may include a zeolite. Zeolites are a class of porous minerals that may be used to remove from ink waste impurities or colorants that are polar and metals that are bonded by surface absorption. In examples wherein the layer for removing metal and polar compounds 110 includes zeolite, the zeolite may include aluminum, silicon, and oxygen in its structure. In addition to aluminum, silicon, and oxygen in its structure, the zeolite in these examples may also include, in its structure, one or more of the following elements in cation form: sodium, calcium, magnesium, and potassium. Additionally, in these examples, the pore size of the zeolite may vary greatly. In some examples, the pore size of the zeolite may be a few microns. In other examples, the pore size may be hundreds of microns.

The mineral known as "zeolite" or "zeolites" may have many different chemical elements in its composition. In general, zeolites are aluminosilicate minerals that can carry water in their crystalline structure and have the formula $M_2/nO.Al_2O_3.xSiO_2.yH_2O$, where "M" can be any one of a number of metals, including sodium, lithium, potassium, calcium and magnesium, the variable "n" stands for the valence of the metal cation, "x" stands for the number of silica units, and "y" stands for the number of water molecules in the structure of zeolite. A zeolite will usually have at least one silicon atom for every aluminum atom.

In some examples, the layer for removing metal and polar compounds 110 may also include impurities, which may function as drying agents. In some examples, the impurities may include one or more of the following chemicals: barium oxide, anhydrous calcium chloride, calcium sulfate, anhydrous magnesium, magnesium sulfate, metallic sodium, phosphorus pentoxide, solid potassium, anhydrous forms of potassium carbonate, quicklime, sodium hydroxide, sodium pentoxide, anhydrous forms of sodium sulfate, and sulfate. In one example, the layer for removing metal and polar compounds may include impurities totaling 5 weight percent (wt-%) of the layer. In other examples, the impurities may be of any weight percent.

The layer for removing non-polar color impurities 112 may function as a decolorant. It may be used to remove from ink waste, if any, non-polar color impurities which may have molecular structures containing aromatics or unsaturated bonds. In some examples, the layer for removing non-polar color impurities 112 may include activated carbon. Activated carbon may include carbon that has been processed such that it has a high surface area. In examples wherein the layer for removing non-polar color impurities 112 includes activated carbon, the surface area of the activated carbon used may be greater than 500 square meters per gram ($m^2/g$).

The layer for removing acid functional components 114 may function as an acid scavenger. It may be used to remove from ink waste, if any, acid functional components that may be from the dissolved components in ink waste. These dissolved components may include dyes, polymeric dispersants, charge directors, and rheology modifiers. In some examples, the layer for removing acid functional components 114 may include alumina. In examples wherein the layer for removing acid functional components 114 includes alumina, the alumina may include aluminum and oxygen in its structure; in one example, the chemical formula of the alumina may be $Al_2O_3$. Additionally, in these examples, the alumina may be basic. In some examples, the pH of the alumina may be greater or equal to 9.

The layer for removing additives with polar or protic functional groups 116 may function as a hydrogen bonder. It may be used to remove from ink waste, if any, additives with polar or protic functional groups that may be from the dissolved components in ink waste. These dissolved components may include dyes, polymeric dispersants, charge directors, and rheology modifiers. In some examples, the layer for removing additives with polar or protic functional groups 116 may include silica. In examples wherein the layer for removing additives with polar or protic functional groups 116 includes silica, the silica may include silicon and oxygen in its structure; in one example, the chemical formula of the silica may be $SiO_2$. Additionally, in these examples, silica with different mesh sizes may be used. In some examples, the silica may have a mesh size between 100 and 600.

The layer for removing residual water 118 may function as a desiccant. It may be used to remove from ink waste, if any, residual water. In some examples, the layer for removing residual water 118 may include one or more of the following chemicals: barium oxide, anhydrous calcium chloride, calcium sulfate, anhydrous magnesium, magnesium sulfate, metallic sodium, phosphorus pentoxide, solid potassium, anhydrous forms of potassium carbonate, quicklime, sodium hydroxide, sodium pentoxide, anhydrous forms of sodium sulfate, and sulfate. If the layer for removing residual water 118 includes more than one chemical, the chemicals may have any ratio to each other. In some examples, the chemical or chemicals may be granular in form, meaning that the diameter of each chemical particle may be a few millimeters. In other examples, the chemical or chemicals may be powdered in form, meaning that the diameter of each chemical particle may be a few microns.

In some examples of the filtration unit 106, the plurality of absorbent layers 110-118 may be layered in between a top layer and a bottom layer. In some examples, the top layer and bottom layer may function as structural support for the plurality of absorbent layers 110-118. In some examples, the top layer and bottom layer may function as particulate filters. The top layer and bottom layer may be packed densely enough such that the plurality of absorbent layers 110-118 is trapped between them but other liquids can still pass through. In one example, the top layer may include sand and the bottom layer may include glass frit. In other examples, the top layer and the bottom layer may include one or more of the following materials: aluminum gauze, cotton, glass frit, glass wool, sand, and sponge. In examples wherein glass frit is used, the glass frit may have pore sizes ranging from 40 to 100 microns.

The plurality of absorbent layers 110-118 and the top and bottom layers, if any, may be layered in a housing unit 108. In some examples, the housing unit 108 may be tubular in shape. However, no particular shape is required and in other examples, the housing unit may be of any shape.

As the ink waste exits the filtration unit 106, it may be fed through the connector 120 into a quality verification unit that may include: the device 122 that analyzes the absorbance of the ink waste and the device 124 that measures the conductivity of the ink waste. In some examples, the device 122 that analyzes ultraviolet-visible absorbance may be in series with the device 124 that measures conductivity. In other examples, the device 122 that analyzes ultraviolet-visible absorbance may be otherwise connected to the device 124 that measures conductivity. In yet other examples, the device 122 that measures ultraviolet-visible absorbance and the device 124 that measures conductivity may be located in a single housing unit.

If the device 122 analyzing ultraviolet-visible absorbance determines that the ink waste has absorbance at any wavelength between 380 nm and 800 nm, the ink waste may be fed through the connector 130 back to the tank of ink waste 102. If the device 122 determines that the ink waste has no absorbance at wavelengths between 380 nm and 800 nm, the ink waste may be fed through the connector 128 into the second tank 132 and can be used as recycled carrier in new formulations of ink. In one example, the device 122 that analyzes ultraviolet-visible absorbance may be a spectrophotometer.

Additionally, if the device 124 determines that the ink waste has a conductivity greater than 1 pS/cm, the ink waste may be fed through the connector 130 back to the tank of ink waste 102. If the device 124 determines that the ink waste has a conductivity less than 1 pS/cm, the ink waste may be fed through the connector 128 into the second tank 132 and can be used as recycled carrier in new formulations of ink. In one example, the device 124 that measures conductivity may be an electrical conductivity meter.

In some examples, the devices 122-124 measuring ultraviolet-visible absorbance and conductivity may be connected to the printer 126 that can print out ultraviolet-visible absorbance readings of the ink waste, conductivity readings of the ink waste, or both depending on which device or devices the printer 126 is connected to.

Figure 1B:
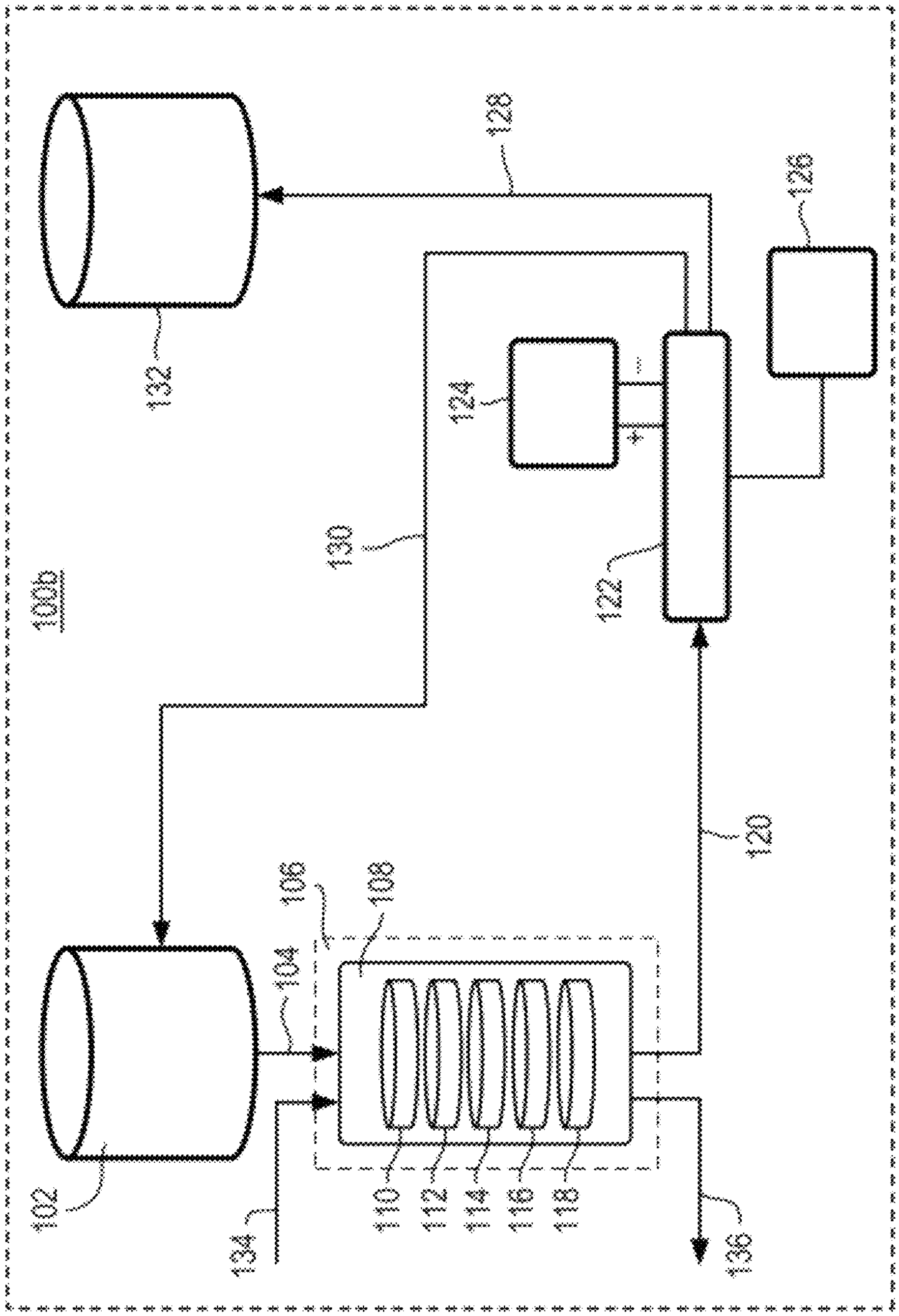
FIG. 1B illustrates one example of a system including an apparatus for conducting single-pass filtration of ink waste, a feedback loop for monitoring the quality of the filtered ink, and separate inlet and outlet lines for passing regeneration chemicals through the apparatus for conducting single-pass filtration of ink waste.

FIG. 1B illustrates one example of a system including an apparatus for conducting single-pass filtration of ink waste, a feedback loop for monitoring the quality of the filtered ink, and separate inlet and outlet lines for passing regeneration chemicals through the apparatus for conducting single-pass filtration of ink waste. In some examples of the filtration unit 106, the plurality of absorbent layers 110-118 may be stacked beds and can be regenerated with chemicals. In order to regenerate the plurality of absorbent layers 110-118, an inlet line 134 may be used to feed regeneration chemicals into the filtration unit 106 and an outlet line 136 may be used to drain the regeneration chemicals from the filtration unit 106.

A variety of different regeneration chemicals may be fed through the filtration unit 106 in order to regenerate the plurality of absorbent layers 110-118. In some examples, solvents may be used. In examples wherein solvents are used, aliphatic hydrocarbons such as hexanes and cyclohexanes may be used. In other examples wherein solvents are used, halocarbons such as dichloromethane, dibromomethane, diiodomethane, chloroform, bromoform, iodoform, and carbon tetrachloride may be used. In yet other examples wherein solvents are used, alcohols such as methanol, ethanol, and isopropanol may be used. In even other examples wherein solvents are used, aromatics such as benzene, toluene, xylene, and the halogenated forms of benzene, toluene, and xylene may be used.

In another example, instead of an inlet line 134 and an outlet line 136 for feeding solvents into the filtration unit 106 in order to regenerate the plurality of absorbent layers 110-118, replaceable cartridges may be used. In one example, each of the absorbent layers in the plurality of absorbent layers may be placed in a separate cartridge that can be removed and replaced when necessary.

Figure 2:
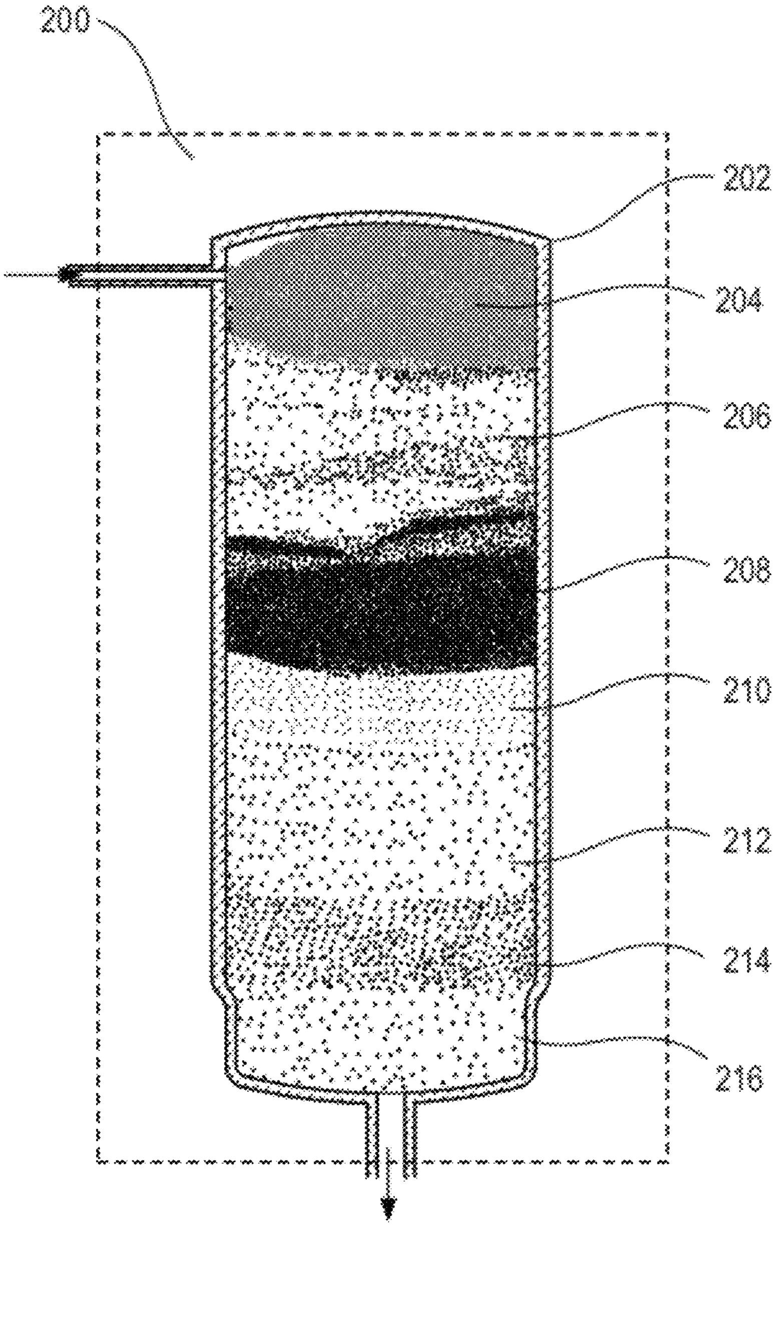
FIG. 2 depicts one example of an apparatus for conducting single-pass filtration of ink waste including a plurality of absorbent layers.

FIG. 2 depicts one example of an apparatus 200 for conducting single-pass filtration of ink waste with a plurality of absorbent layers 206-214. The apparatus 200 includes a tubular housing unit 202, a top layer 204, a plurality of absorbent layers 206-214, and a bottom layer 216. As shown in FIG. 2, the top layer may be composed of sand and the bottom layer may be composed of glass frit. In some examples, the first absorbent layer 206 may be a layer for removing metal and polar compounds including zeolite and 5 wt-% aluminum sulfate. In some examples, wherein the first absorbent layer 206 includes zeolite, the general molecular formula for zeolite may be $Na_2O.Al_2O_3.xSiO_2.yH_2O$, wherein "x" and "y" are stoichiometric coefficients as described above. In some examples, the second absorbent layer 208 may be a layer for removing non-polar color impurities including activated carbon. In examples wherein the second absorbent layer 208 includes activated carbon, the activated carbon may have a surface area between 500 $m^2/g$ and 1000 $m^2/g$. In some examples, the third absorbent layer 210 may be a layer for removing acid functional components including alumina. In one example, wherein the third absorbent layer 210 includes alumina, the alumina is basic and has a pH of 8. In some examples, the fourth absorbent layer 212 may be a layer for removing additives with polar or protic functional groups including silica gel. In one example, wherein the fourth absorbent layer 212 includes silica gel, the particle size of the silica gel may be 40 microns and the pore size may be 60 angstroms. In some examples, the fifth absorbent layer 214 may be a layer for removing residual water including sodium sulfate. In examples wherein the fifth absorbent layer 214 includes sodium sulfate, the sodium sulfate particles may be granular. Additionally, in these examples, the fifth absorbent layer 214 may also include calcium chloride. In examples wherein the fifth absorbent layer 214 includes both sodium sulfate and calcium chloride, the calcium chloride may make up 5 wt-% to 25 wt-% of the layer.

Figure 3:
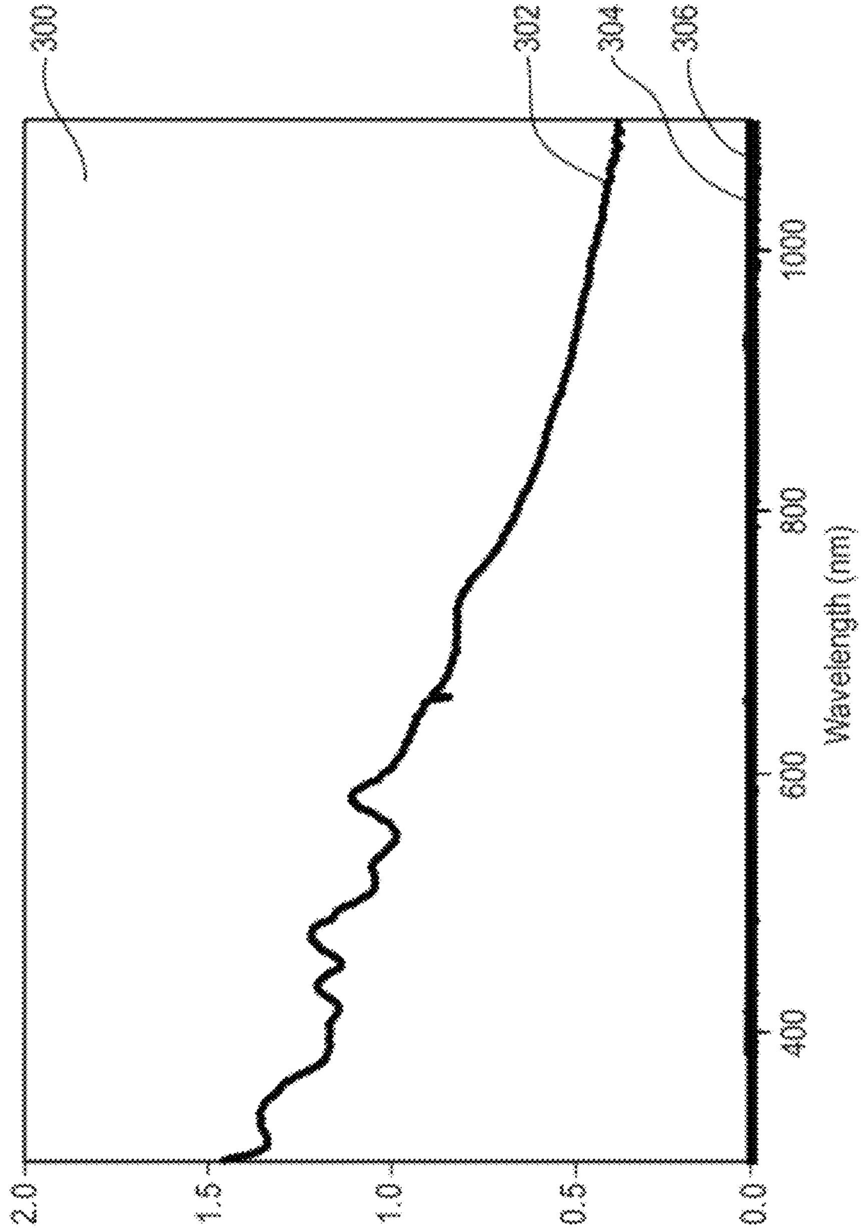
FIG. 3, on coordinates of absorbance (a.u.) and wavelength (nm), is a graph depicting the ultraviolet-visible absorbance of ISOPAR™ L, the ink waste before filtration, and the ink waste after a single pass through the apparatus described herein.

FIG. 3 shows the ultraviolet-visible absorbance of the ink waste before filtration 302, the ink waste after single-pass filtration 304 as described herein, and ISOPAR™ L 306. From the graph 300, it appears that after a single pass through the filtration apparatus as described herein, the filtered ink waste 304 had no ultraviolet or visible absorbance, suggesting that most in the additives of the ink waste were effectively filtered. The remaining additives, if any, may have included oils that did not have ultraviolet-visible absorbance and therefore, would not affect the jetting performance and stability of the printing process if found in ink formulations.

The conductivity of the ink waste before filtration 302 and the conductivity of the ink waste after single-pass filtration 304 as described herein are shown in Table I as compared to ISOPAR™ L 306. From the table, it is shown that the ink waste after single-pass filtration 304 as described herein has a low conductivity similar to that of ISOPAR™ L 306.

TABLE I

Conductivity of Ink Carrier and Ink Waste Before and After Filtration

| Formulation | Conductivity (pS/cm) |
|---|---|
| Ink Waste Before Filtration 302 | 20.0 |
| Ink Waste After Filtration 304 | 0.8 |
| ISOPAR ™ L 306 | 0.9 |

Figure 4:
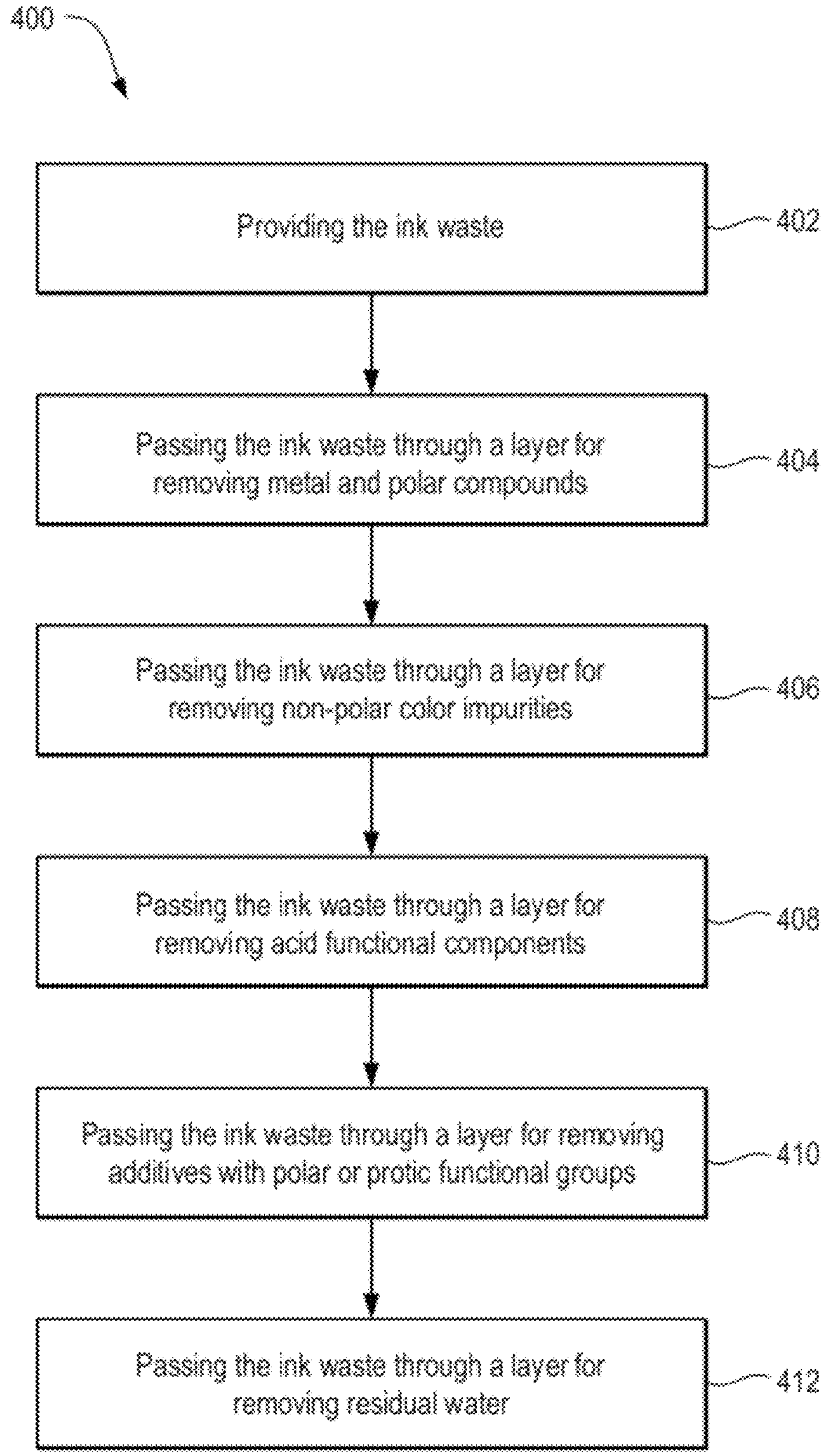
FIG. 4 is a flow chart depicting an example of a process for single-pass filtration of ink waste.

FIG. 4 is a flow chart depicting one example of a process for single-pass filtration of ink waste that utilizes the apparatus for single-pass filtration as described herein. The process 400 may include providing the ink waste 402 and then, passing the ink waste through a plurality of absorbent layers 404-412. The ink may be passed through the plurality of absorbent layers in any order. As depicted in FIG. 4, in one example, the ink may be passed through a layer for removing metal and polar compounds 404 first, a layer for removing non-polar color impurities 406 second, a layer for removing acid functional components 408 third, a layer for removing additives with polar or protic functional groups 410 fourth, and a layer for removing residual water 412 last.

In some examples, the process 400 may utilize vacuum filtration as a method for filtering the ink waste through the plurality of absorbent layers 404-412. However, in other examples, the process 400 may utilize any type of filtration. Accordingly, the appropriate operating conditions may vary depending on the type of filtration. In other words, the operating temperatures and pressures are dependent on the equipment utilized rather than the components of the absorbent layers. For example, filtration may be conducted under positive pressures when explosion-proof containment is utilized, or alternatively, may be conducted under negative pressures when reinforced containment is utilized. In one example, a filtration process may use positive pressure when air or inert gas is pushed above a liquid in order to force it through a filter. In another example, a filtration process may use negative pressure when a vacuum is applied below liquid level in order to pull liquid through a filter.

In some examples, after the ink waste is filtered, the filtered ink waste may be passed through a quality verification unit that may include a device that measures whether the ink waste has ultraviolet-visible absorbance and a device that measures the conductivity of the ink waste. As described herein, the two devices may be connected in series or may be otherwise connected. Then, if the ink waste is determined to have absorbance at any wavelength between 380 nm and 800 nm or a conductivity greater than 1 pS/cm, the ink waste may be passed through the plurality of absorbent layers one or more additional times.

What is claimed is:

1. A process for conducting single-pass filtration of ink waste including:

providing said ink waste; and passing said ink waste through a plurality of absorbent layers, wherein said absorbent layers are in any order and include:

a layer for removing metal and polar compounds;

a layer for removing non-polar color impurities;

a layer for removing acid functional components;

a layer for removing additives with polar or protic functional groups; and a layer for removing residual water.

2. The process according to claim 1, wherein said ink waste is passed through five absorbent layers in the following order:

said layer for removing metal and polar compounds, wherein said layer for removing metal and polar compounds includes a zeolite;

said layer for removing non-polar color impurities, wherein said layer for removing non-polar color impurities includes activated carbon;

said layer for removing acid functional components, wherein said layer for removing acid functional components includes basic alumina;

said layer for removing additives with polar or protic functional groups, wherein said layer for removing additives with polar or protic functional groups includes silica; and said layer for removing residual water, wherein said layer for removing residual water includes one or more compounds selected from the group consisting of anhydrous calcium chloride, barium oxide, calcium sulfate, anhydrous magnesium, magnesium sulfate, metallic sodium, phosphorus pentoxide, solid potassium, anhydrous forms of potassium carbonate, quicklime, sodium hydroxide, sodium pentoxide, anhydrous forms of sodium sulfate, and sulfate.

3. The process according to claim 2, wherein said layer for removing metal and polar compounds further includes one or more compounds selected from the group consisting of barium oxide, anhydrous calcium chloride, calcium sulfate, anhydrous magnesium, magnesium sulfate, metallic sodium, phosphorus pentoxide, solid potassium, anhydrous forms of potassium carbonate, quicklime, sodium hydroxide, sodium pentoxide, anhydrous forms of sodium sulfate, and sulfate.

4. The process according to claim 1, further including:

passing said ink waste through a quality verification unit, wherein said quality verification unit includes:

a first detector for measuring the ultraviolet-visible absorbance of said ink waste; and a second detector for measuring the conductivity of said ink waste.

5. The process according to claim 4, further including:

passing said ink waste through said plurality of absorbent layers an additional time if said ink waste is determined by said quality verification unit to have absorbance at any wavelength between 380 nm and 800 nm or a conductivity greater than 1 pS/cm.

6. The process according to claim 1, further including:

passing regeneration chemicals through said plurality of absorbent layers to regenerate said absorbent layers.

7. The process according to claim 6, wherein said regeneration chemicals include one or more chemicals selected from the group consisting of aliphatic hydrocarbons, halocarbons, alcohols, and aromatics.

* * * * *